(12) United States Patent
Childers et al.

(10) Patent No.: US 8,384,773 B2
(45) Date of Patent: Feb. 26, 2013

(54) METHOD AND SYSTEM FOR DISPLAYING AN IMAGE IN THREE DIMENSIONS

(75) Inventors: Winthrop D. Childers, San Diego, CA (US); Timothy F. Myers, Philomath, OR (US); William Wagner, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1814 days.

(21) Appl. No.: 10/817,012

(22) Filed: Apr. 1, 2004

(65) Prior Publication Data

US 2005/0225630 A1    Oct. 13, 2005

(51) Int. Cl.
*H04N 13/00* (2006.01)
*H04N 13/04* (2006.01)
*G02B 27/22* (2006.01)

(52) U.S. Cl. .......... 348/60; 348/42; 348/51; 348/56; 348/57; 359/462; 359/464

(58) Field of Classification Search .......... 348/51, 348/42, 60
See application file for complete search history.

(56) References Cited

U.S. PATENT DOCUMENTS

| | | | | |
|---|---|---|---|---|
| 4,236,172 A * | 11/1980 | Krasnoperov | | 348/60 |
| 5,481,321 A | 1/1996 | Lipton | | |
| 5,671,007 A * | 9/1997 | Songer | | 348/49 |
| 5,870,137 A * | 2/1999 | Stuettler | | 348/51 |
| 5,921,650 A | 7/1999 | Doany et al. | | |
| 6,335,755 B1 * | 1/2002 | McLaine et al. | | 348/47 |
| 6,417,892 B1 | 7/2002 | Sharp et al. | | |
| 6,503,195 B1 | 1/2003 | Keller et al. | | |
| 6,582,080 B2 | 6/2003 | Gibbon et al. | | |
| 6,612,704 B2 | 9/2003 | Ogawa | | |
| 6,667,784 B2 | 12/2003 | Sharp et al. | | |
| 6,850,352 B1 * | 2/2005 | Childers | | 359/237 |
| 2002/0021261 A1 | 2/2002 | Werner | | |
| 2002/0190922 A1 | 12/2002 | Tsao | | |
| 2003/0020809 A1 | 1/2003 | Gibbon et al. | | |
| 2003/0112507 A1 * | 6/2003 | Divelbiss et al. | | 359/464 |
| 2003/0169496 A1 | 9/2003 | Varona | | |
| 2003/0234790 A1 * | 12/2003 | Hochmuth et al. | | 345/545 |

(Continued)

FOREIGN PATENT DOCUMENTS

| | | |
|---|---|---|
| WO | WO 98/33331 | 7/1998 |
| WO | WO 00/74392 | 12/2000 |

(Continued)

OTHER PUBLICATIONS

Sato, Koki; Takano, Kunihiko; "New Type Electro-Holographic Display System Using LCDs"; 2002 SPIE.*

(Continued)

*Primary Examiner* — Justin Shepard (57) ABSTRACT

A method and system for displaying an image in three dimensions during a frame period. The method includes generating a left image sub-frame and a right image sub-frame. The left image sub-frame defines a visual perspective of a left eye and the right image sub-frame defines a visual perspective of a right eye for the image. The method further includes displaying the left image sub-frame utilizing a first plurality of colors and displaying the right image sub-frame utilizing a second plurality of colors. The first plurality of colors is distinct from the second plurality of colors.

21 Claims, 11 Drawing Sheets

U.S. PATENT DOCUMENTS

2004/0058715 A1* 3/2004 Taniguchi et al. ............ 455/566
2004/0252756 A1* 12/2004 Smith et al. ............. 375/240.01
2005/0037843 A1* 2/2005 Wells et al. ..................... 463/30
2005/0254702 A1* 11/2005 Era ............................... 382/154

FOREIGN PATENT DOCUMENTS

| WO | WO 02/076107 A1 | 9/2002 |
| WO | WO 2004019621 A1 * | 3/2004 |
| WO | WO 2004/038457 | 5/2004 |

OTHER PUBLICATIONS

Bolas, Mark; "New Research and Explorations into Multiuser Immersive Display Systems"; Jan./Feb. 2004 IEEE.*
Anderson, Duncan; "Uniform color illumination for scrolling color Lcos projection"; 2002 SPIE.*
Translation of ERA WO 2004019621A1.*
Mokoto Okui et al, "A Study on Scanning Methods for a Field-Sequential Stereoscopic Display", IEEE Transactions on Circuits and Systems for Video Technology, V. 10(2), March.

* cited by examiner

METHOD AND SYSTEM FOR DISPLAYING AN IMAGE IN THREE DIMENSIONS

BACKGROUND

Digital projector systems or devices are frequently used to display a still or video image. Viewers frequently desire to see images high in resolution, brightness, and color purity, and low in objectionable visual artifacts such as flicker.

Projection systems are becoming increasingly commonplace in the home theatre venue and are often used to display movies and computer images. Projection systems are also popular among video game enthusiasts because of their rich and vibrant display capabilities.

It is often desirable for a projector system to produce stereoscopic or three dimensional (3D) images such as 3D movies and 3D video games. Typically, the projection of 3D images requires two separate image projectors, one dedicated to projecting left eye images, and the other dedicated to projecting right eye images. The left and right images are displayed in spatially offset positions on a suitable viewing surface. The left and right images each carry different perspectives. By viewing the images through glasses configured to allow the left image to be perceived by only the left eye and the right image to be perceived by only the right eye, a viewer is able to see a single composite 3D image.

The left and right images in a 3D video are often composed of the blue and red portions of the color gamut, respectively. These blue and red images are typically displayed in alternating video frames. Such 3D systems result in undesirable visual artifacts such as flicker and loss of color gamut. Other 3D display systems use polarizing filters to separate the left and right images. However, these systems suffer from light inefficiencies and often have complicated and expensive optics.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

A method and system for displaying an image frame in 3D or in 2D with a single light engine is described herein. The light engine is configured to operate in either a 3D mode of operation or in a 2D mode of operation. The mode of operation may be selected by a user of the light engine, for example. The light engine may comprise. a spatial light modulator and an image processing unit configured to control the operation of the spatial light modulator. In one exemplary embodiment, if the light engine is operating in a 3D mode of operation, the image processing unit may generate left and right image sub-frame data, which is used by the spatial light modulator to generate left and right image sub-frames. The left and right image sub-frames may then be displayed on a viewing surface each carrying different perspectives during a single frame period such that a 3D image is perceived by a viewer wearing special 3D glasses. The left image sub-frame may include a first group of colors (such as a first set of primary colors) and the right image sub-frame may include a second group of colors (such as a second set of primary colors) distinct from the first group of colors.

In another exemplary embodiment, if the light engine is operating in a 2D mode of operation, the image processing unit may generate 2D image frame data, which is used by the spatial light modulator to generate a 2D image frame. The 2D image frame may then be displayed on the viewing surface during the single frame period such that a 2D image is perceived by a viewer. The 2D image frame may include some or all of the colors in the first and second groups of colors.

In the following description, for purposes of explanation, numerous specific details are set forth in order to provide a thorough understanding of the present method and system. It will be apparent, however, to one skilled in the art that the present method and system may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

The terms "display system" and "light engine" will be interchangeably used herein and in the appended claims to refer to a front projector, a rear projector, liquid crystal display (LCD) panel, or any other analog or digital display system configured to display an image. The image may be displayed on any suitable viewing surface. The term "image" will be used herein and in the appended claims, unless otherwise specifically denoted, to refer broadly to a still image, series of images, motion picture video, or anything else that is displayed by a display system.

Figure 1:
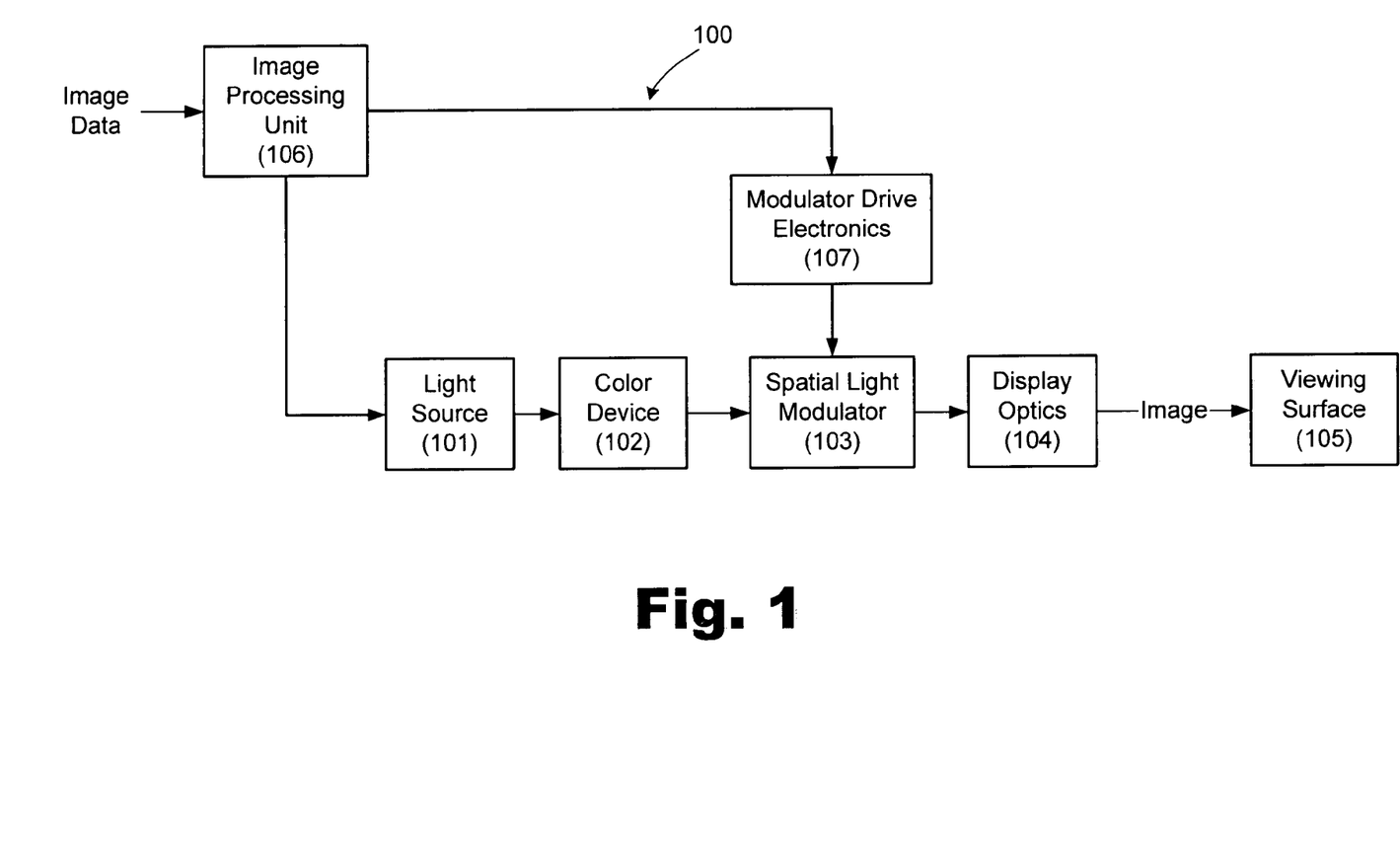
FIG. 1 illustrates an exemplary display system according to one exemplary embodiment.

FIG. 1 illustrates an exemplary display system (100) according to an exemplary embodiment. The components of FIG. 1 are exemplary only and may be modified, changed, or added to as best serves a particular application. The display system (100) is configured to generate and display pixels upon various screen pixel locations of a viewing surface (105). The term "pixel," as used herein and in the appended claims, unless otherwise specifically denoted, will be used to refer to a portion of the image that is displayed in a particular pixel location of the viewing surface (105). Thus, the image comprises a number of pixels. As shown in FIG. 1, image data is input into an image processing unit (106). The image data defines an image that is to be displayed by the display system (100). While one image is illustrated and described as being processed by the image processing unit (106), it will be understood by one skilled in the art that a plurality or series of images may be processed by the image processing unit (106). The image processing unit (106) performs various functions including controlling the illumination of a light source (101) and controlling a spatial light modulator (SLM) (103).

As shown in FIG. 1, the light source (101) may provide a beam of light to a color device (102). The light source (101) may be, but is not limited to, a high pressure mercury lamp. The color device (102) enables the display system (100) to display a color image. The color device (102) may be, but is not limited to, a sequential color device or scrolling color device, for example. Alternatively, the color device (102) may be a "parallel" color device such as an arrangement of dichroic mirrors that split light into primary colored light, such as red, green, and blue light. An alternate embodiment does not include a color device (102).

Light transmitted by the color device (102) may be focused onto the SLM (103) through a lens or through some other device (not shown). An SLM is a device that modulates incident light in a spatial pattern corresponding to an electrical or optical input. The terms "SLM" and "modulator" will be used interchangeably herein to refer to a spatial light modulator. The incident light may be modulated in its phase, intensity, polarization, direction, wavelength, color, hue, or any other property inherent to light by the modulator (103). Thus, the SLM (103) of FIG. 1 modulates the light output by the color device (102) based on input from the image processing unit (106) to form an image bearing beam of light that is eventually displayed or cast by display optics (104) onto a viewing surface (105) such as a screen. The display optics (104) may comprise any device configured to display or project an image. For example, the display optics (104) may be, but are not limited to, a lens configured to project and focus an image onto a viewing surface.

If the color device (102) is a parallel color device, then the SLM (103) may comprise a number of modulators (103) corresponding to each primary color. For example, if the color device (102) outputs red, green, and blue, the display system (100) may include three modulators (103).

The SLM (103) may be, but is not limited to, a liquid crystal on silicon (LCOS) array, a micromirror array, a diffractive light device (DLD), a flat panel display, or an analog LCD panel. LCOS and micromirror arrays are known in the art and will not be explained in detail in the present specification. An exemplary, but not exclusive, LCOS array is the Philips™ LCOS modulator. An exemplary, but not exclusive, micromirror array is the Digital Light Processing (DLP) chip available from Texas Instruments™ Inc.

As mentioned, the SLM (103) may also be an interferometric device, referred to hereafter as a diffractive light device (DLD), in one exemplary embodiment. A DLD has an array of SLM pixel elements or cells that are each independently controllable to receive white light and output light having a spectral distribution that is peaked about a particular wavelength such as red, green, blue, cyan, magenta, yellow, violet, orange, or other colors. When we say that a SLM pixel element outputs a certain color, we mean that it is outputting a spectral distribution that is peaked about that color.

Each cell in a DLD includes an optical cavity with a dimension normal to the array of cells that is responsive to the application of a voltage across opposing plates that help to define the cavity. The cavity may be defined by controlling voltage across the opposing plates or controlling charge injection to one or both of the opposing plates. The dimension of that optical cavity determines the output spectral peak as discussed above. Further, the cavity has a black state at a certain dimension wherein nearly all of the light is absorbed.

In one alternative embodiment, the SLM (103) may be an analog LCD panel that is configured to pass continuously varying or analog amounts of polarized light depending on a voltage applied to each SLM pixel element. An LCD panel can operate in either a pulse width modulation mode or in an analog mode.

Figure 2:
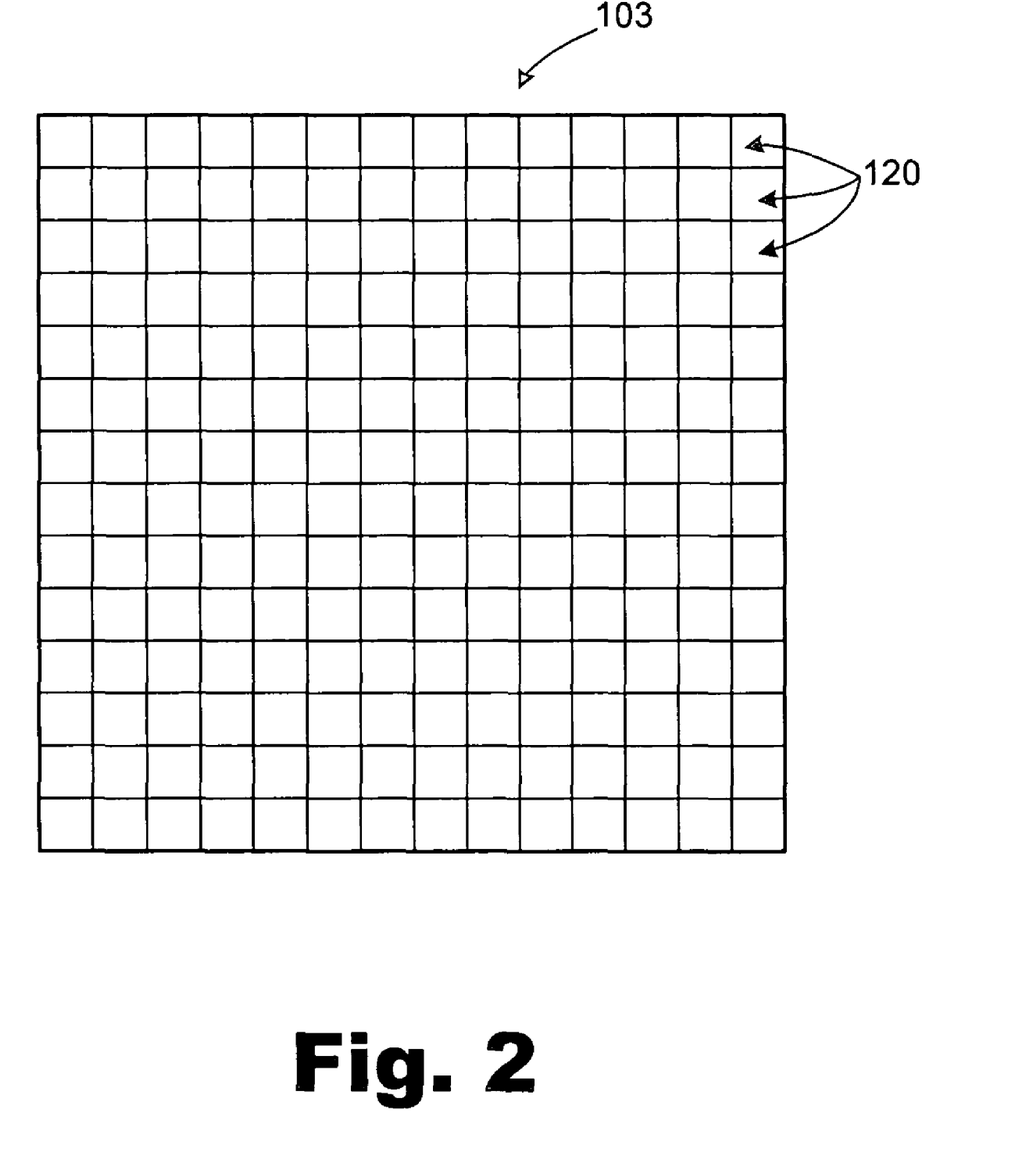
FIG. 2 illustrates an exemplary spatial light modulator that may be used in a display system according to one exemplary embodiment.

FIG. 2 illustrates an exemplary SLM (103) that may be used in the above-described display system (100; FIG. 1) according to one exemplary embodiment. The exemplary SLM (103) of FIG. 2 comprises an array of micromirrors (120), or SLM pixel elements, for illustrative purposes. The array of micromirrors (120) comprises a number of rows of micromirrors (120). The micromirrors (120) may be operated in a digital, or bistable, manner. Digital operation fully deflects a given micromirror to either a first position or a second position. The first position is the "on" position and the second position is the "off" position. Light generated by the light source (101; FIG. 1) illuminates the entire array of micromirrors. Micromirrors deflected to the first position reflect light along a first path, whereas micromirrors deflected to a second position reflect light along a second path. The display optics (104; FIG. 1) of the display system (100; FIG. 1) collect the light from the mirrors in the first or "on" position and focus the light onto the viewing surface (105; FIG. 1). The light reflected by micromirrors in the second or "off" position is prevented from reaching the viewing surface. In one exemplary embodiment, each micromirror or SLM pixel element may correspond to a pixel location on the viewing surface (105; FIG. 1) upon which the image is displayed. A pixel location on the viewing surface (105; FIG. 1) associated with an SLM pixel element in the "on" position is illuminated, whereas a pixel location on the viewing surface (105; FIG. 1) associated with an SLM pixel element in the "off" position is not illuminated or is in a "black" state.

Returning to FIG. 1, the display system (100) may further include modulator drive electronics (107) configured to control the operation of the SLM (103). In particular, the modulator drive electronics (107) may be configured to control the operation of the micromirrors (120; FIG. 2) or other types of SLM elements. The modulator drive electronics (107) may include row select logic (not shown) and column drive logic (not shown) configured to send update data to the array of micromirrors (120; FIG. 2) to indicate whether each of the micromirrors is to be in the "on" or "off" position at a given time. In other embodiments, the display system (100) may not include modulator drive electronics (107).

The SLM (103) may be configured to produce an image with varying levels of intensity, or gray scale levels. The term "gray scale level" may refer to the intensity of individual primary colors, such as red, green, and blue, or it can refer to the total intensity or luminance of a particular pixel. In one embodiment, the SLM (103) may use pulse width modulation or spatial modulation to generate a gray scale level for a particular pixel. In other words, a SLM pixel element may be rapidly turned on and off within a given frame period to generate a desired gray scale level for a pixel that is displayed in the SLM pixel element's corresponding pixel location on the viewing surface (105). If an SLM pixel element is pulsed quickly enough within a given frame period, the human eye will accurately measure the gray scale level of the pixel during that frame, but will fail to detect the pulsing. The SLM (103) may generate gray scale levels for pixels using other methods such as varying the intensity of light delivered to the pixels' corresponding pixel locations throughout a frame period.

Figure 3:
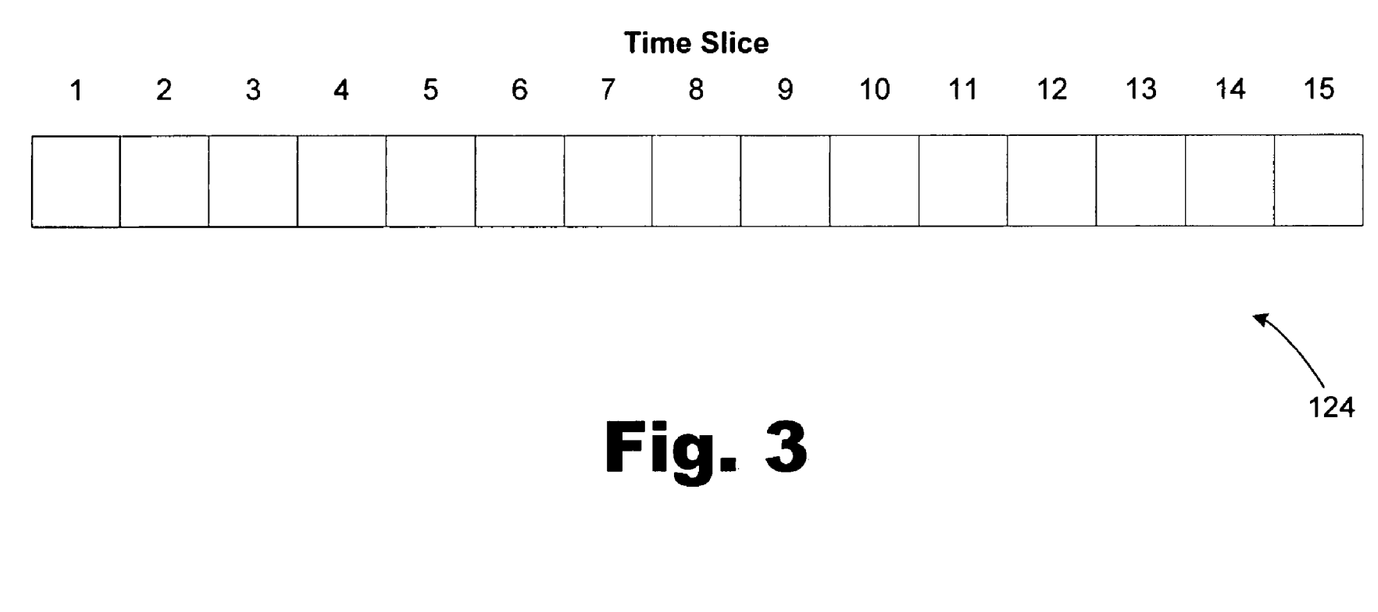
FIG. 3 illustrates an exemplary frame period that has been divided into a number of time slices according to one exemplary embodiment.

FIG. 3 illustrates an exemplary frame period (124) that has been divided into a number of time slices. The division of a frame period (124) into a number of time slices allows a light engine (100; FIG. 1) to generate an image having pixels with varying intensities or gray scale levels. Although the exemplary frame (124) of FIG. 3 is divided into fifteen time slices, the frame (124) may be divided into any number of time slices as best serves a particular application. In one exemplary embodiment, as will be described below, the frame period (124) may be divided into a number of sub-frame periods each including a number of time slices to facilitate the display of two or more image sub-frames during a single frame period. For example, a particular pixel displayed on the viewing surface (105; FIG. 1) may have a first color during a first sub-frame period and a second color during a second sub-frame period.

Figure 4:
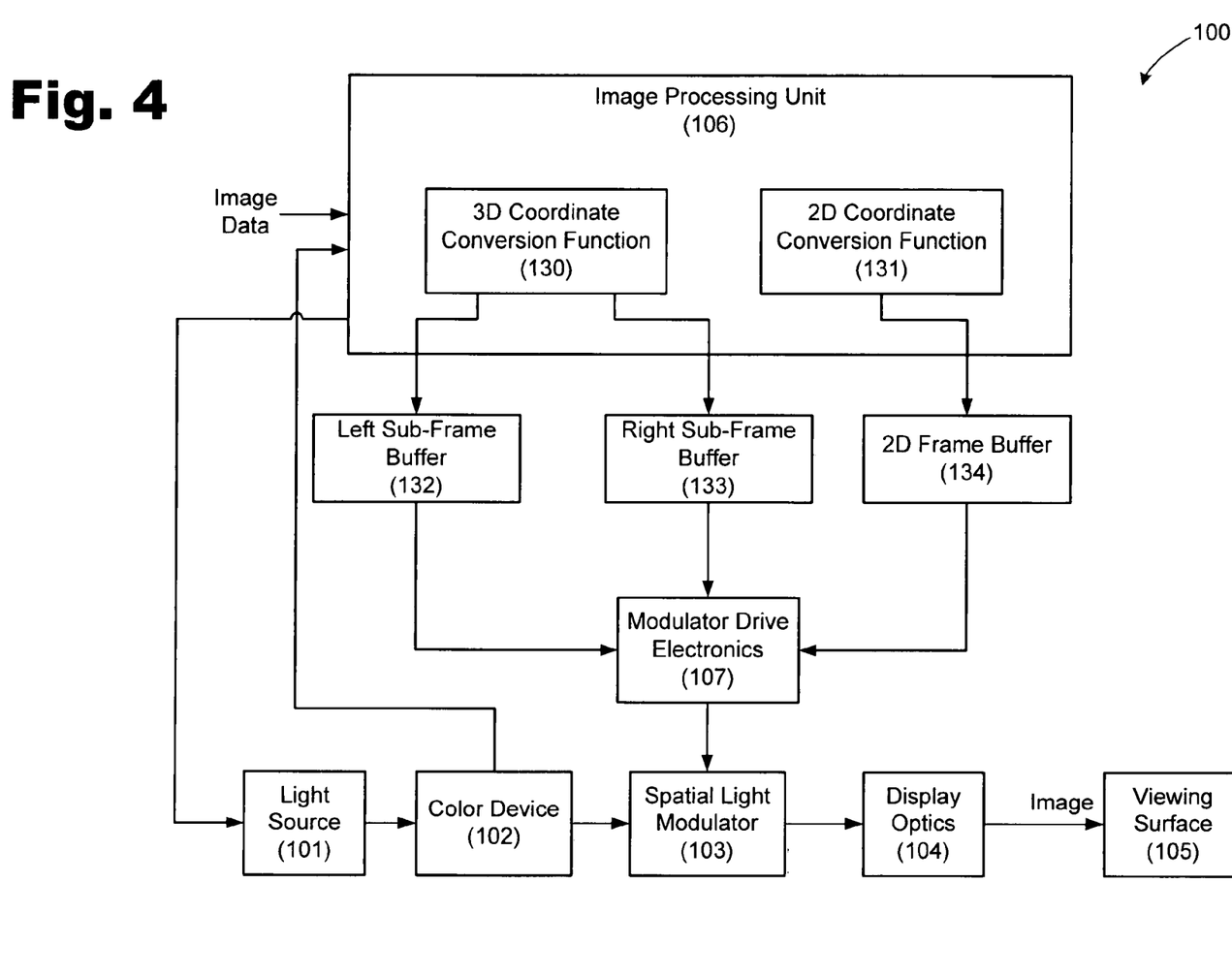
FIG. 4 illustrates an alternative embodiment with an expanded view of exemplary functions inside the image processing unit according to one exemplary embodiment.

FIG. 4 illustrates an alternative embodiment of the display system (100) with an expanded view of exemplary functions (130, 131) inside the image processing unit (106). FIG. 4 also illustrates that the display system (100) may also include a number of buffers (132-134). According to an exemplary embodiment, these functions (130, 131) in combination with the buffers (132-134) allow for the generation and display of an image on the viewing surface (105) in either 2D or in 3D.

In one exemplary embodiment, as shown in FIG. 4, the image processing unit (106) may include a 3D coordinate conversion function (130) and a 2D coordinate conversion function (131). Although the following examples will be explained with the image processing unit (106) having both the 3D coordinate conversion function (130) and the 2D coordinate conversion function (131), in an alternative embodiment, the image processing unit (106) may only include the 3D coordinate conversion function (130).

In one exemplary embodiment, the 3D coordinate conversion function (130) may be configured to process the image data to define two or more image sub-frames that constitute an image frame. As used herein and in the appended claims, unless otherwise specifically denoted, an "image frame" refers to a composite image in either 3D or 2D that is displayed on the viewing surface (105) during a single frame period. As mentioned, each frame period may be divided into a number of sub-frame periods during which the image sub-frames defined by the 3D coordinate conversion function (130) may be displayed on the viewing surface (105).

More specifically, the 3D coordinate conversion function (130) may be configured to define a left image sub-frame and a right image sub-frame. The data defining the left image sub-frame and the right image sub-frame may be temporarily stored in a left sub-frame buffer (132) and in a right sub-frame buffer (133), respectively, before being sent to the modulator drive electronics (107). The modulator drive electronics (107) may then use the data in the left sub-frame buffer (132) and in the right sub-frame buffer (133) to cause the SLM (103) to generate the left image sub-frame and the right image sub-frame, respectively. The left and right image sub-frames may then be displayed sequentially, simultaneously, or in an interleaved manner, as will be illustrated below. The left and right image sub-frames are left and right perspectives of the 3D image. In other words, the left image sub-frame provides the perspective for the left eye and the right image sub-frame provides the perspective for the right eye for the 3D image. In one exemplary embodiment, as will be explained below, a person viewing the image frame wears glasses configured such that the left image sub-frame is perceived by the person's left eye only and the right image sub-frame is perceived by the person's right eye only. In this manner, the person's eyesight integrates the separate left and right images into a single 3D image.

In one exemplary embodiment, the left and right image sub-frames may include different color portions of light that define an image frame. For example, the left image sub-frame may include the red, green, and blue portions of the light defining the image frame and the right image sub-frame may include the cyan, yellow, and magenta portions of the light defining the image frame. In one exemplary embodiment, the left and right image sub-frames may include any number of colors. For example, the left image sub-frame may alternatively include just the red and blue portions of the light defining the image frame and the right image sub-frame may include just the green portion of the light defining the image frame. In another example, the left image sub-frame may include red, green, and blue and the right image sub-frame may include cyan and yellow. Furthermore, it is important to note that a particular color may be in either the left or right image sub-frame.

In one exemplary embodiment, each of the left and right sub-frames includes at least a nearly complete set of color primaries. By way of an illustrative embodiment for the following examples the left image sub-frame includes a first set of color primaries including red, green, and blue and the right image sub-frame includes a second set of color primaries including cyan, yellow, and magenta.

Figure 5:
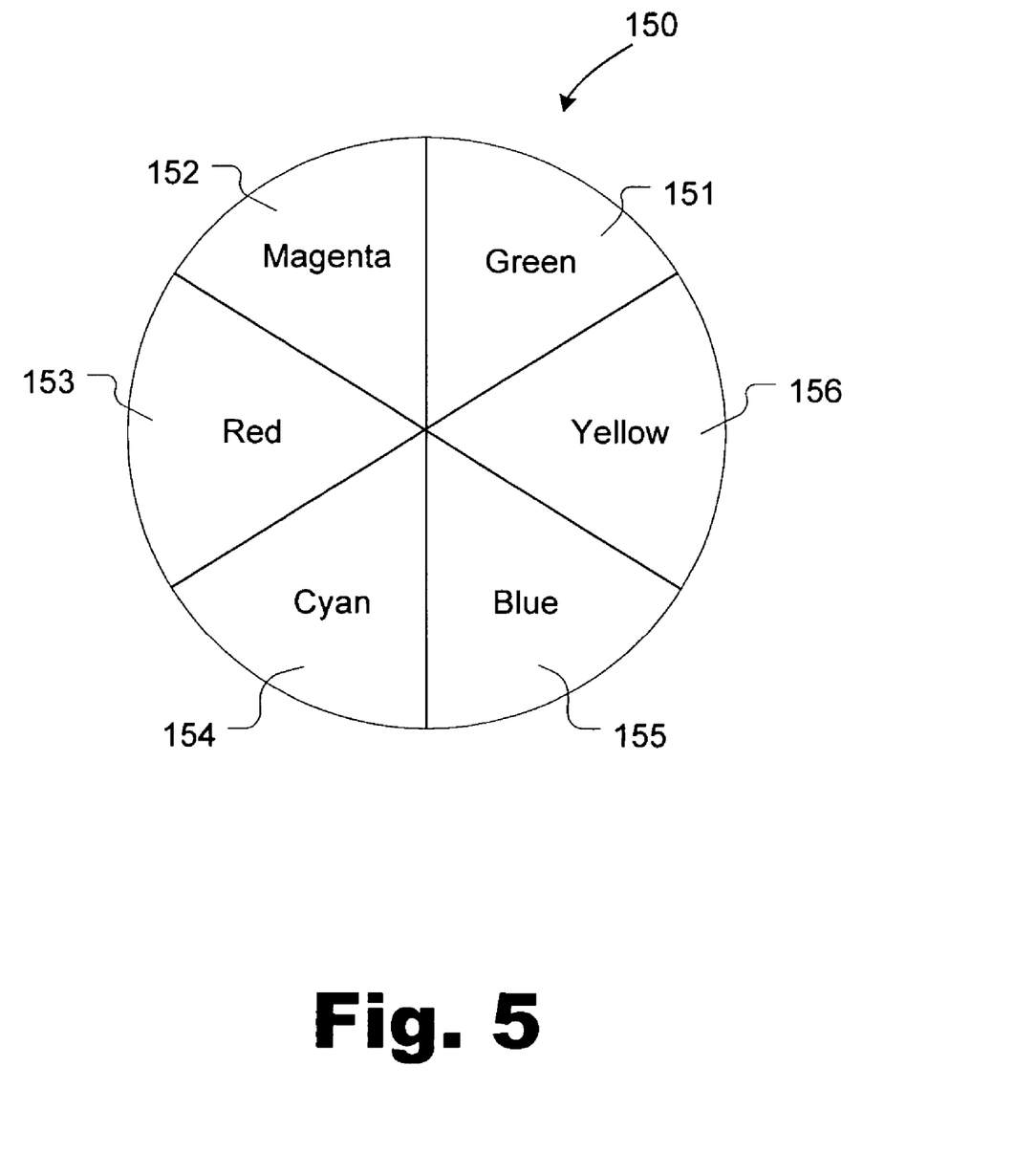
FIG. 5 illustrates an exemplary color wheel according to one exemplary embodiment.

In one exemplary embodiment, the color device (102) is a sequential color device such as a color filter wheel. FIG. 5 illustrates an exemplary color filter wheel (150). As shown in FIG. 5, the color filter wheel (150) may be divided into a number of primary color filter segments (151-156). Each filter segment is configured to allow a certain color portion of the light generated by the light source (101; FIG. 4) to sequentially pass through the filter segment as the color filter wheel (150) rotates in the path of the incident white light. For example, filter segment (151) allows only the green portion of the light generated by the light source (101; FIG. 4) to pass through filter segment (151). Likewise, filter segment (152) passes the magenta portion, filter segment (153) passes the red portion, filter segment (154) passes the cyan portion, filter segment (155) passes the blue portion, and filter segment (156) passes the yellow portion. The color wheel (150) is configured to spin at a high rate and periodically generate a sequence of green, magenta, red, cyan, blue, and yellow light. When used in 2D mode, the color filter wheel (150) allows for an expanded gamut of colors to be shown on the viewing surface (105; FIG. 1) as compared to a color filter wheel with only three primary colors. In 3D mode, the color filter wheel (150) allows for the generation of two separate perspectives while each is able to provide a range of colors that overlap. This avoids undesirable visual artifacts such as flicker and loss of color gamut created by blue-red 3D techniques.

In an alternative embodiment, the filter segments (151-156) of the color wheel (150) have different polarizations. By assigning a particular polarization to the colors to be included in the left image sub-frame and a different polarization to the colors to be included in the right image sub-frame, common polarizing 3D glasses may be used by a viewer to create the 3D image.

Returning to FIG. 4, the image processing unit (106) may be configured to coordinate the timing of the color wheel (150; FIG. 5) with the operation of the 3D coordinate conversion function (130) and the SLM (103) such that the left image sub-frame includes only the red, green, and blue portions of the image frame while the right image sub-frame includes only the cyan, yellow, and magenta portions of the image frame. Alternatively, as noted above, the left image sub-frame may include the cyan, yellow, and magenta portions of the image frame while the right image sub-frame may include the red, green, and blue portions of the image frame.

Figure 6:
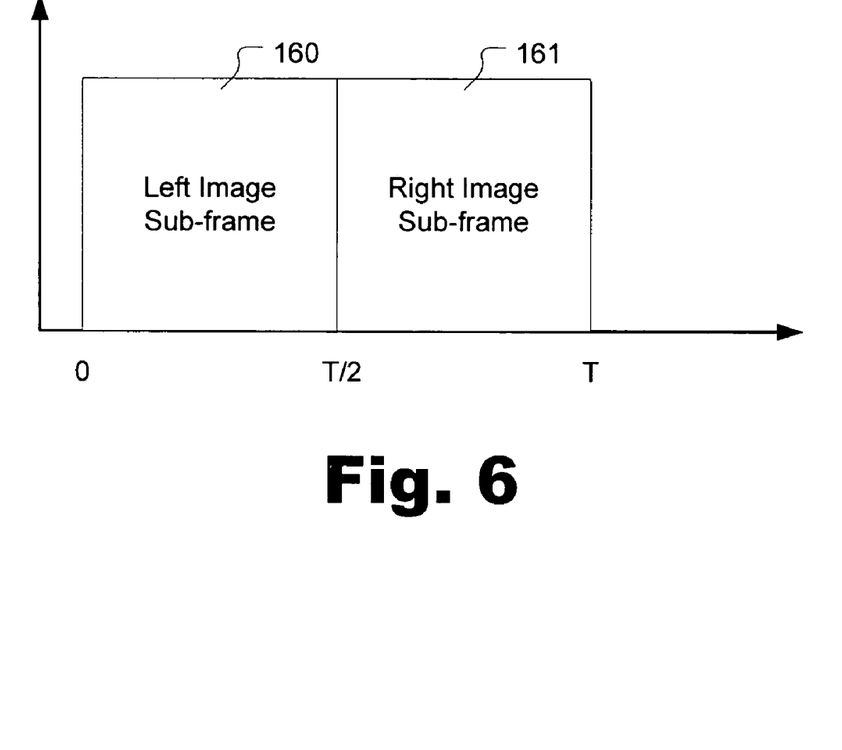
FIG. 6 illustrates that left and right image sub-frames may be each displayed once per frame period in a sequential manner according to one exemplary embodiment.

FIG. 6 illustrates that the left and right image sub-frames (160, 161) may be each displayed once per frame period (T) in a sequential manner. As shown in FIG. 6, the frame period may be divided into two sub-frame periods, each with length T/2. The left image sub-frame (160) is displayed between times 0 and T/2 and the right image sub-frame (161) is displayed between times T/2 and T. The order in which the left and right image sub-frames (160, 161) are displayed within a frame period may be modified as best serves a particular application.

Figure 7:
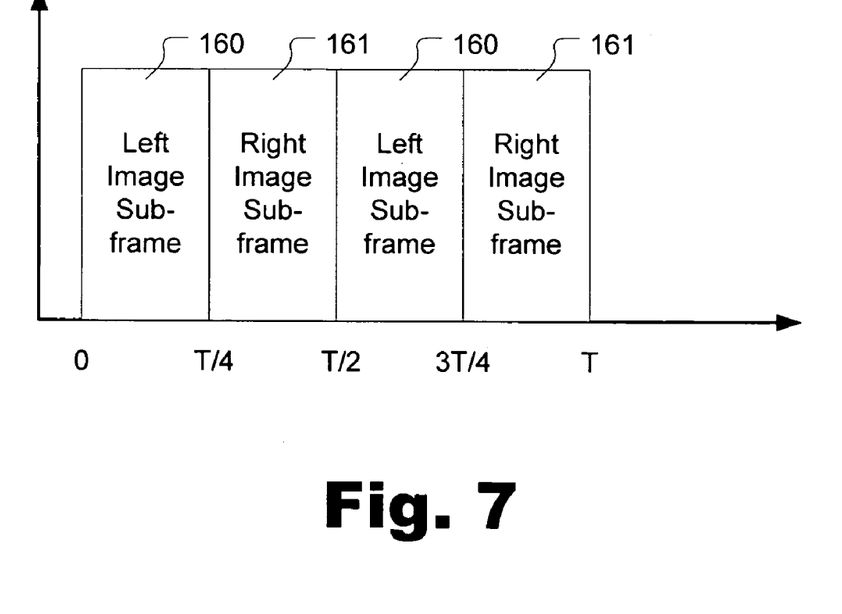
FIG. 7 illustrates that left and right image sub-frames may alternatively be displayed in an interleaved manner during a frame period according to one exemplary embodiment.

FIG. 7 illustrates that the left and right image sub-frames (160, 161) may alternatively be displayed in an interleaved manner during a frame period. In other words, the left and right image sub-frames (160, 161) may be displayed more than once during a particular frame period. For example, as shown in the exemplary timing diagram of FIG. 7, the left image sub-frame (160) may be displayed twice during the frame period—once between times 0 and T/4 and once between times T/2 and 3T/4. Likewise the right image sub-frame (161) may be displayed twice during the frame period—once between times T/4 and T/2 and once between times 3T/4 and T. In one exemplary embodiment, the frame period may be divided into any number of time periods during which left and right image sub-frames (160, 161) may be displayed in an interleaved manner.

By displaying the left and right image sub-frames (160, 161) in a sequential or interleaved manner as described in connection with FIGS. 6 and 7 respectively, undesirable visual artifacts such as flicker may be reduced or eliminated in the resulting 3D image. Furthermore, by including two or more primary colors in each of the image sub-frames (160, 161), the resulting 3D image may not suffer from color separation artifacts, as do traditional blue-red 3D image generation systems.

Figure 8:
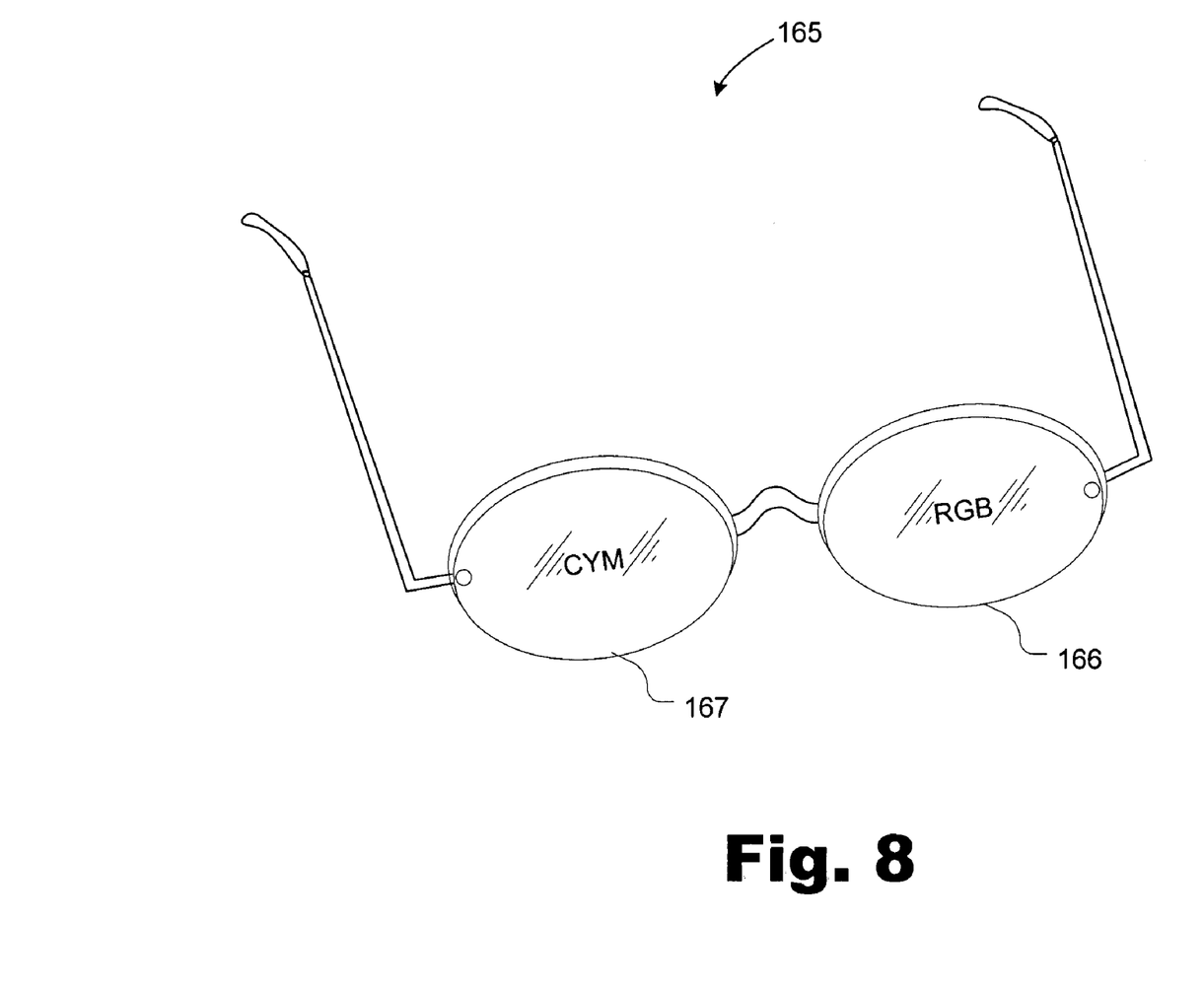
FIG. 8 illustrates an exemplary pair of glasses that may be worn by a person viewing a three dimensional image according to one exemplary embodiment.

FIG. 8 illustrates an exemplary pair of eyeglasses (165) that may be worn by a person viewing the 3D image when using complimentary primaries for each viewing perspective. As shown in FIG. 8, the left lens (166) may be configured to allow only certain colors such as red, green, and blue light (RGB) to pass through the lens (166). In one exemplary embodiment, three rugate notch filters in series may be used to filter out the primary colors cyan, yellow, and magenta such that only red, green, and blue light pass through the left lens (166). Likewise, the right lens (167) may be configured to allow only certain colors such as cyan, yellow, and magenta light (CYM) to pass through the lens (167). In one exemplary embodiment, three rugate notch filters in series may be used to filter out the primary colors red, green, and blue such that only cyan, yellow, and magenta light pass through the right lens (167). Rugate and other notch filters are known within the art. In general, the left lens (166) is configured to pass through the colors included in the left image sub-frame but not the colors in the right image sub-frame, and the right lens (167) is configured to pass through the colors included in the right image sub-frame but not the colors in the left image sub-frame. By allowing the left eye to only perceive the left image sub-frame and the right eye to only perceive the right image sub-frame, the glasses (165) facilitate the display of a 3D image while still allowing for viewing full color of a 2D image. Alternatively, the eyeglasses (165) may be in the form of a set of contact lens or a set of lenses positioned in a fixed location and through which the user may view the image.

Returning to FIG. 4, the display system (100) may also be configured to operate in a 2D mode wherein the display system (100) generates a 2D image. As will be described below, in an exemplary embodiment, a user of the display system (100) may select between a 3D mode of operation for the display system (100) and a 2D mode of operation for the display system (100). If the 3D mode is selected, the display system (100) generates and displays a 3D image on the viewing surface (105) as described above. On the other hand, if the 2D mode is selected, the display system (100) generates and displays a 2D image on the viewing surface (105).

In one exemplary embodiment, the 2D coordinate conversion function (131) may be configured to process the image data to define a 2D image frame that is to be displayed on the viewing surface (105) during a frame period. In one exemplary embodiment, the 2D coordinate conversion function (131) and the 3D coordinate conversion function (130) may both process the image data regardless of whether the display system (100) is operating in 2D or 3D mode. The data defining the 2D image frame may be temporarily stored in a 2D frame buffer (134) before being sent to the modulator drive electronics (107). The modulator drive electronics (107) may then use the data in the 2D frame buffer (134) to cause the SLM (103) to generate the 2D image frame. The 2D image frame may then be displayed on the viewing surface (105).

In one exemplary embodiment, the 2D image frame includes all the colors that are included in both the right and left image sub-frames. For example, if the color device (102) is the color wheel (150; FIG. 5) described in connection with FIG. 5, the 2D image frame may include all six colors—red, green, blue, cyan, yellow, and magenta thus increasing the gamut of colors available for display.

The image processing unit (106), including the 3D coordinate conversion function (130) and the 2D coordinate conversion function (131), may be hardware, software, firmware, or a combination of these. In one embodiment, one or more components of the image processing unit (106) are included in a computer, computer server, or other microprocessor-based system capable of performing a sequence of logic operations. In addition, the image processing may be distributed throughout the display system (100) with individual portions of the image processing unit (106) being implemented in separate system components. The image processing unit (106) may alternatively comprise any electronics configured to generate a plurality of image sub-frames. Furthermore, the left sub-frame buffer (132), right sub-frame buffer (133), and 2D frame buffer (134) may include non-volatile memory such as a hard disk drive or other persistent storage or include volatile memory such as random access memory (RAM). A single buffer unit may perform the functions of the left sub-frame buffer (132), right sub-frame buffer (133), and 2D frame buffer (134) in an alternative embodiment.

In another exemplary embodiment, the color device (102) of FIG. 4 may include two color wheels. A first color wheel may be used when the display system (100) is operating in 3D mode and a second color wheel may be used when the display system (100) is operating in 2D mode. The first color wheel may be similar to the color wheel (150; FIG. 5) shown in FIG. 5 and have more than 3 primary color filter segments. The second color wheel may be a traditional color wheel having only 3 primary color filter segments, for example. However, the first and second color wheels may have any number of color filter segments, according to an exemplary embodiment.

In yet another exemplary embodiment, the color device (102) of FIG. 4 may be a scrolling color device. Scrolling color devices are known in the art and will not be explained in detail. The scrolling color device may be, but is not limited to, a spinning prism engine or a "pinwheel" style color wheel.

In yet another exemplary embodiment, the display system (100) may comprise multiple spatial light modulators (103), each receiving light from separate color devices (102) such as a color filter wheel, the color filter wheels each having a different set of color segments. In this embodiment, one SLM may be configured to receive data defining the left sub-frame image and another SLM may be configured to receive data defining the right sub-frame image. The separate sub-frame images may then be projected onto the viewing surface, either independently or through combining optical elements.

Figure 9:
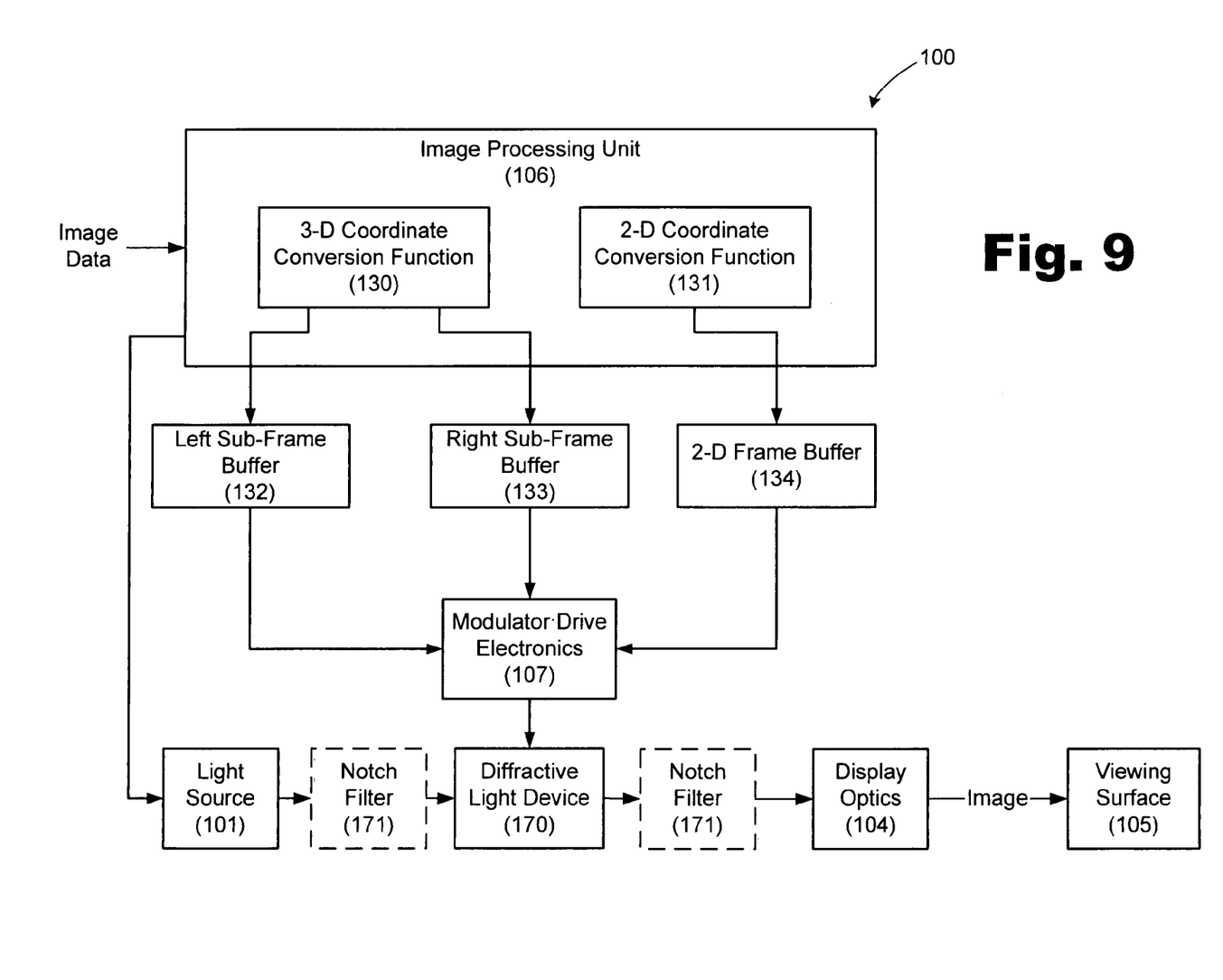
FIG. 9 illustrates an exemplary display system configured to operate in either three dimensional mode or in two dimensional mode wherein the spatial light modulator is a diffractive light device according to one exemplary embodiment.

FIG. 9 illustrates an exemplary display system (100) configured to operate in either 3D mode or in 2D mode wherein the SLM (103) of FIG. 4 is a color modulator such as a diffractive light device (DLD) (170). Although FIG. 9 shows that the color modulator is a DLD (170), alternative color modulators may also be used for the color modulator (170) such as a pixelated color modulator utilizing electrocapillarity. FIG. 9 shows that if the SLM is a DLD (170), a separate color device (102; FIG. 4) is not needed because the DLD (170) is configured to output light having a spectral peak representing different colors, as previously explained. The method of generating and displaying image sub-frames and image frames in 3D and 2D using the display system (100) of FIG. 9 is the same as was described in connection with FIG. 4.

FIG. 9 illustrates that, in some embodiments, one or more notch filters (171) (such as rugate filters) may be included in the display system (100). The notch filters (171) may be configured to assist in separating out the color peaks generated by the diffractive light device (170). There may be a notch filter (171) before and/or after the DLD (170).

Figure 10:
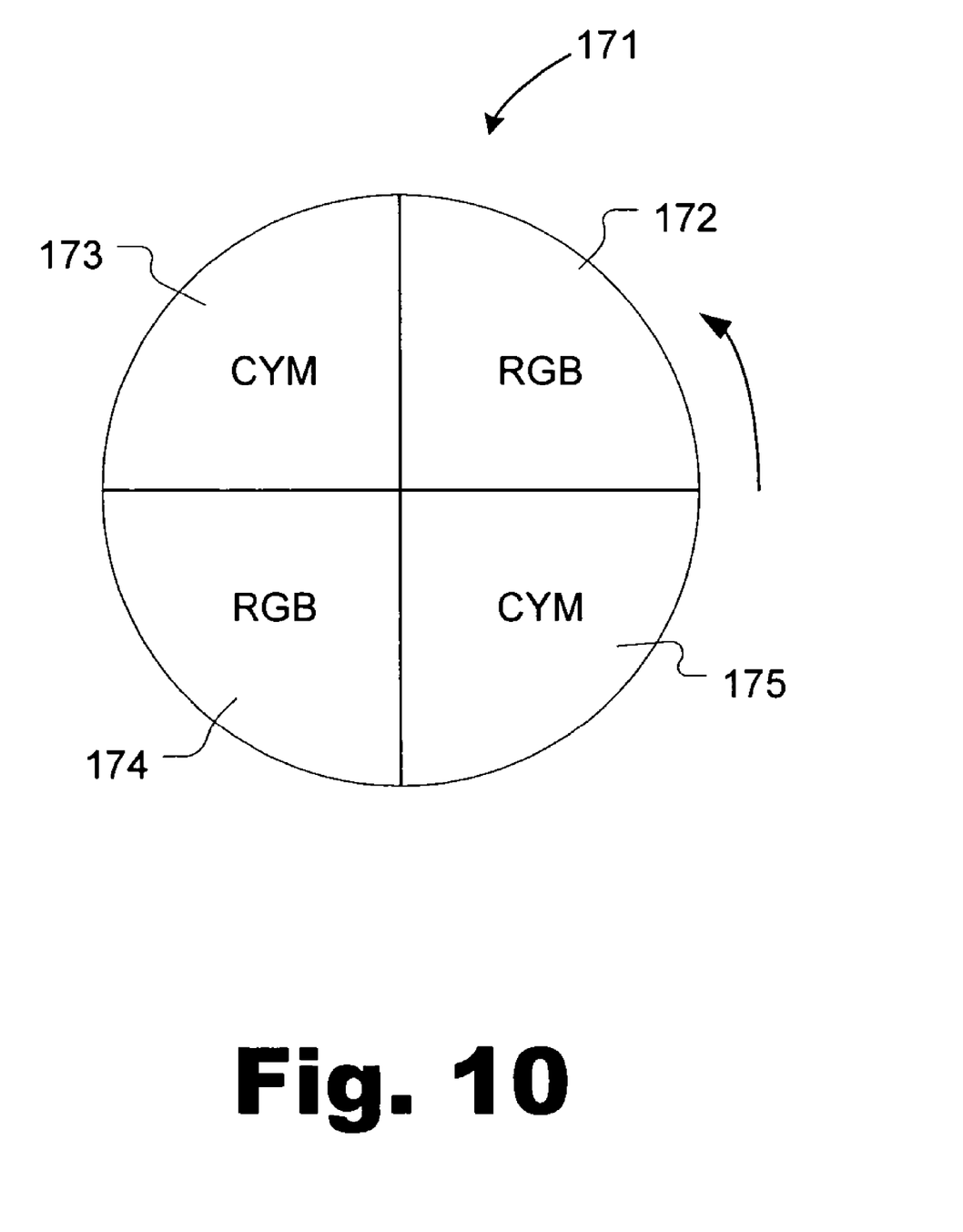
FIG. 10 illustrates an exemplary notch filter according to one exemplary embodiment.

FIG. 10 illustrates an exemplary notch filter (171) according to one exemplary embodiment. The notch filter (171) may operate much like the color wheel (150; FIG. 5) of FIG. 5 (and may be constructed similarly to the notch filter lens previously described with reference to FIG. 8). The exemplary notch filter (171) of FIG. 10 may be divided into a number of filter segments (172-175) that allow certain colors of light to pass through the filter segments (172-175). For example, the notch filter (171) of FIG. 10 is divided into four filter segments (172-175). Two of the filter segments (172, 174) allow the passage of red, green, and blue light (RGB) and the other two filter segments (173, 175) allow the passage or cyan, yellow, and magenta light (CYM). There may be more or fewer filter segments that pass any number of colors of light according to an exemplary embodiment. The notch filter (171) of FIG. 10 may be configured to spin at a rate that is coordinated with the operation of the DLD (170; FIG. 9) such that the left and right image sub-frame include the desired colors. Although the notch filters (171) are illustrated in FIG. 10 as being color wheel-type filters, any other type of filter may be used as the notch filters (171).

Figure 11:
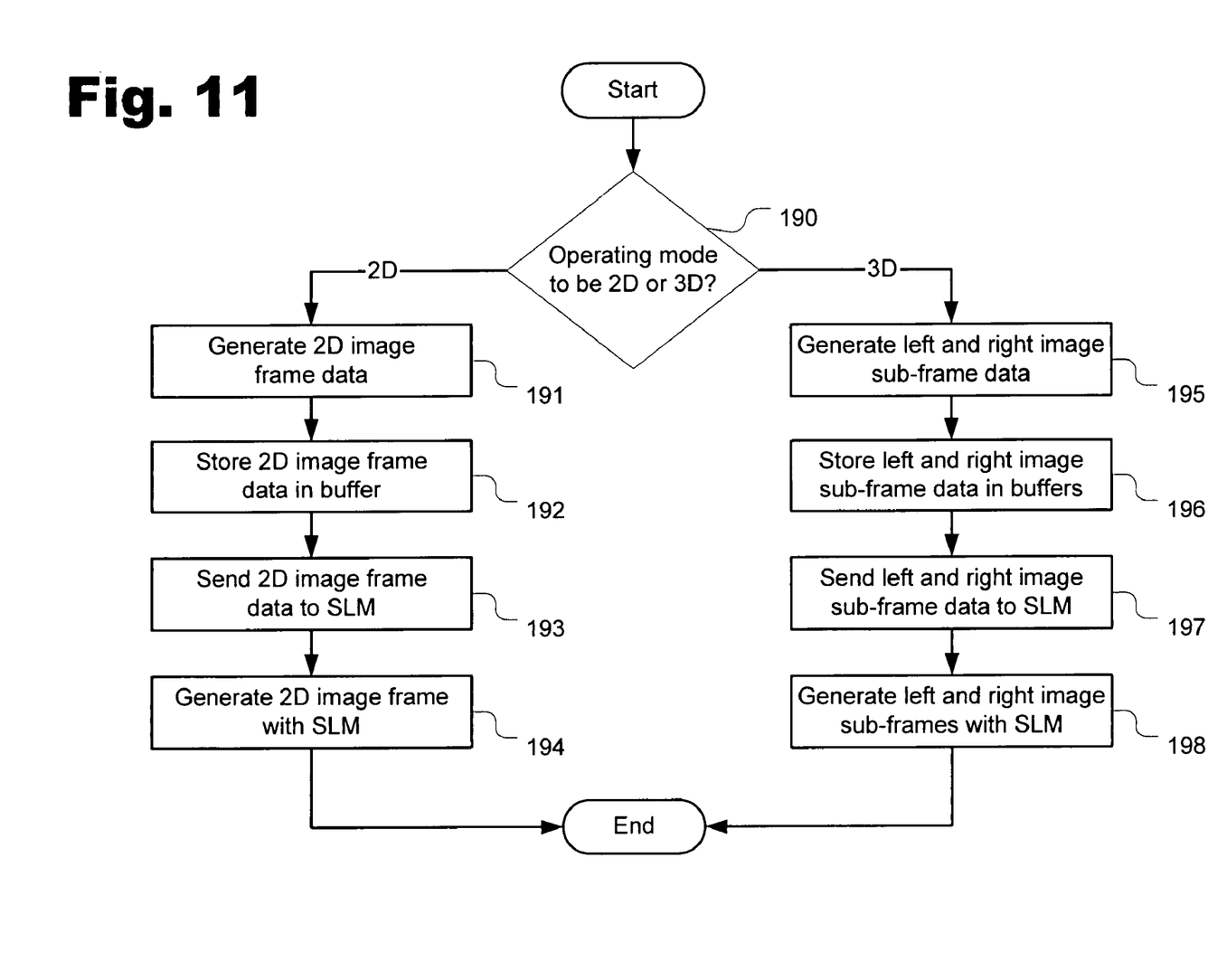
FIG. 11 is a flow chart illustrating an exemplary method of generating a three dimensional or a two dimensional image with a single display system according to one exemplary embodiment.

FIG. 11 is a flow chart illustrating an exemplary method of generating a 3D or a 2D image with a single display system (100; FIG. 1). The exemplary method allows a user of the display system (100; FIG. 1) to choose whether the display system (100; FIG. 1) is to operate in a 2D mode or in a 3D mode (step 190). In an alternative embodiment, the mode of operation of the display system (100; FIG. 1) may be determined by something other than a user. For example, a particular movie that is to be displayed by the display system (100; FIG. 1) may require a 3D mode of operation.

If the display system (100; FIG. 1) is to operate in a 2D mode (2D, step 190), 2D image frame data is generated (step 191). The 2D image frame data may be generated by a 2D coordinate conversion function (131; FIG. 4) as explained in connection with FIG. 4. The 2D image frame data may then be stored in a buffer (step 192) before being sent to the SLM (step 193). The SLM may generate the 2D image frame based on the 2D image frame data (step 194). This 2D image frame may then be displayed on the viewing surface (105; FIG. 4).

Alternatively, if the display system (100; FIG. 1) is to operate in a 3D mode (3D, step 190), left and right image sub-frame data is generated (step 195). The left and right image sub-frame data may be generated by a 3D coordinate conversion function (130; FIG. 4) as explained in connection with FIG. 4. The left and right image sub-frame data may then be stored in buffers (step 196) before being sent to the SLM (step 197). The SLM may generate the left and right image sub-frames on the left and right image sub-frame data (step 198). The left and right image sub-frames may then be displayed on the viewing surface (105; FIG. 4). Alternatively, an external video source such as a video game console or a PC video card can create the left and right image sub-frame data and transfer the image data directly to the left and right image sub-frame buffers.

Figure 12:
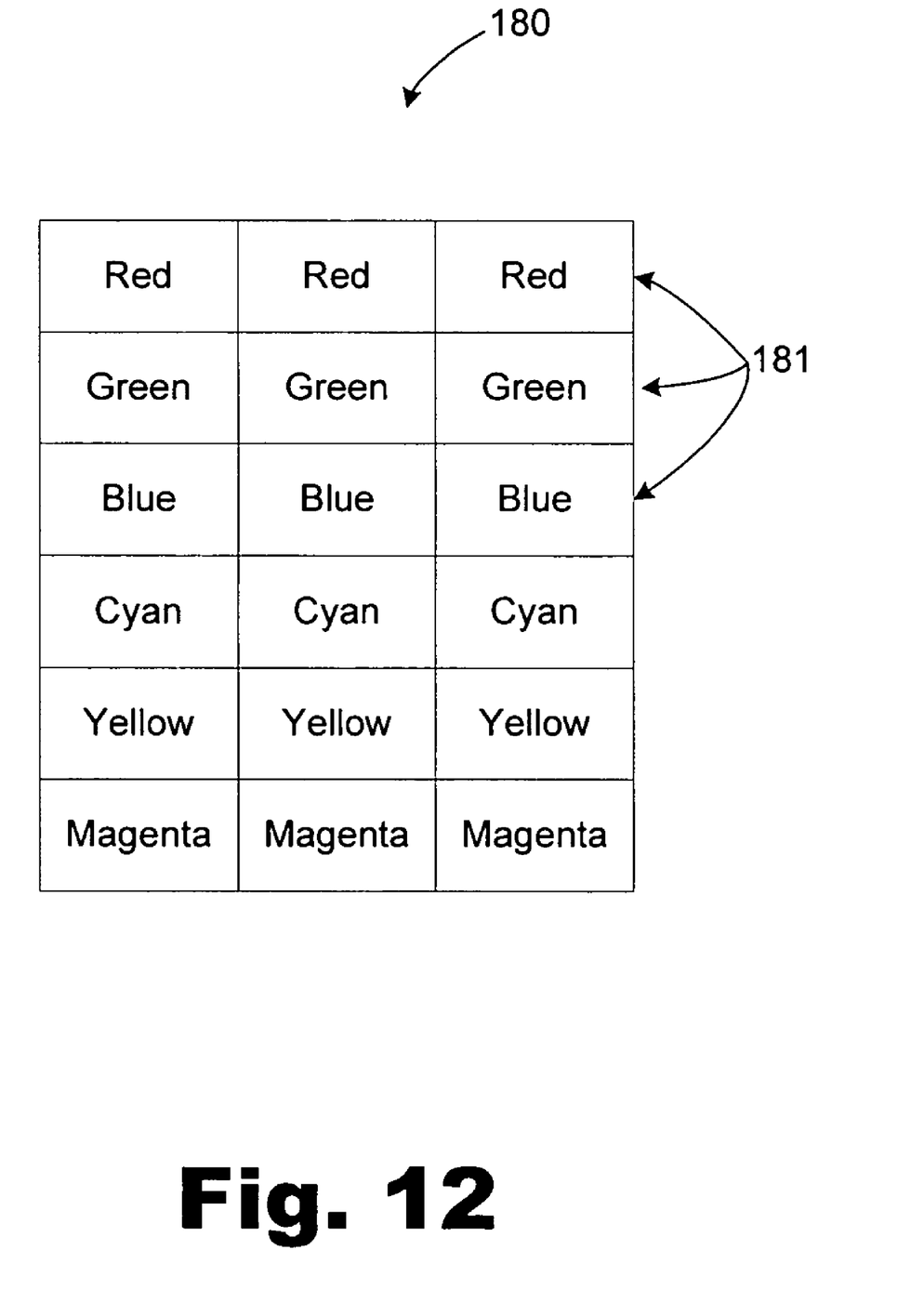
FIG. 12 illustrates an exemplary flat panel display that has been divided up into a number of pixel elements according to one exemplary embodiment.

The method described in connection with FIG. 11 may be applied to a number of variations of the display system (100) described in connection with FIG. 1. For example, in one exemplary embodiment, the display system (100) may comprise a flat panel display such as an organic light emitting diode (OLED) device. FIG. 12 illustrates an exemplary flat panel display (180) that has been divided up into a number of pixel elements (181). Each pixel element is configured to display a color such as red, green, blue, cyan, yellow, or magenta. According to an exemplary embodiment, the flat panel display (180) may be divided into pixel elements of any color. In one exemplary embodiment, if the display system (100; FIG. 1) is operating in 3D mode, the left image sub-frames may be displayed by pixel elements (181) having one of a first set of colors (e.g.; red, green, and blue). Likewise, the right image sub-frames may be displayed by pixel elements (181) having one of a second set of colors (e.g.; cyan, yellow, and magenta). If the display system (100; FIG. 1) is operating in 2D mode, the 2D image frames may be displayed using all of the pixel elements (181).

Although FIGS. 6 and 7 depict left and right image sub-frames as being non-overlapping, this does not have to be the case for some systems. Exemplary systems wherein the left and right image sub-frames may be temporally overlapping in their display include those depicted with respect to FIGS. 9 and 12 as well as systems utilizing scrolling color. In other embodiments, the left and right sub-frames may each span the entire frame period. For example, with a DLD type SLM, adjacent pixels could display alternating right and left sub-frames in a checkerboard type pattern. Such an approach would allow for spatial or sequential display of the right and left image sub-frames to create a range of temporally overlapping sub-frames.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A display system with a selectable mode of operation for displaying an image frame in three dimensions (3D) or in two dimensions (2D), said system comprising:
 a spatial light modulator; and
 an image processing unit configured to control said spatial light modulator in a selected mode of operation which is either a 3D mode of operation or a 2D mode of operation;
 wherein if said selected mode of operation is said 3D mode of operation, said image processing unit outputs to said spatial light modulator a left image sub-frame carrying a left eye perspective and a right image sub-frame carrying a right eye perspective during a frame period and, if said selected mode of operation is said 2D mode of operation, said image processing unit outputs to said spatial light modulator a 2D image frame to be displayed on a viewing surface during said frame period.

2. The system of claim 1, wherein said image processing unit comprises:
 a 3D coordinate conversion function configured to generate left and right image sub-frame data defining said left and right image sub-frames;
 wherein said spatial light modulator is configured to generate said left and right image sub-frames in accordance with said left and right image sub-frame data.

3. The system of claim 2, wherein said image processing unit further comprises:
 a 2D coordinate conversion function configured to generate 2D image frame data defining said 2D image frame;
 wherein said spatial light modulator is further configured to generate said 2D image frame in accordance with said 2D image frame data.

4. The system of claim 3, further comprising:
 a first buffer for storing said left image sub-frame data to be used by said spatial light modulator to generate said left image sub-frame;
 a second buffer for storing said right image sub-frame data to be used by said spatial light modulator to generate said right image sub-frame; and
 a third buffer for storing said 2D image frame data to be used by said spatial light modulator to generate said 2D image frame.

5. The system of claim 4, wherein a single buffer unit comprises said first, second, and third buffers.

6. The system of claim 4, wherein a single buffer unit comprises said first and second buffers.

7. The system of claim 1, wherein said frame period comprises a first sub-frame period and a second sub-frame period, said left image sub-frame being displayed during said first sub-frame period and said right image sub-frame being displayed during said second sub-frame period.

8. The system of claim 1, wherein said frame period comprises a number of sub-frame periods, wherein said left and right image sub-frames are each displayed during one or more of said sub-frame periods in an interleaved manner.

9. The system of claim 1, further comprising glasses, said glasses comprising:
 a left lens configured to allow a left eye of a user of said glasses to only perceive said left image sub-frame; and
 a right lens configured to allow a right eye of a user of said glasses to only perceive said right image sub-frame.

10. The system of claim 1, wherein said left image sub-frame comprises a first group of colors and said right image sub-frame comprises a second group of colors distinct from said first group of colors.

11. The system of claim 10, wherein said 2D image frame comprises one or more of said colors in said first and second groups of colors.

12. The system of claim 10, wherein said first group of colors comprises two or more colors and said second group of colors comprises two or more colors.

13. The system of claim 10, wherein said system further comprises a sequential color device configured to generate said colors in said first and second groups of colors.

14. The system of claim 13, wherein said sequential color device is a color filter wheel.

15. The system of claim 10, wherein said system further comprises a parallel color device configured to generate said colors in said first and second groups of colors.

16. The system of claim 10, wherein said spatial light modulator comprises a diffractive light device configured to generate said colors in said first and second groups of colors.

17. The system of claim 16, further comprising one or more notch filters configured to notch filter light incident upon said diffractive light device.

18. The system of claim 16, further comprising one or more notch filters configured to notch filter light reflected from said diffractive light device.

19. The system of claim 1, wherein said mode of operation is selected by a user of said display system.

20. The system of claim 1, wherein said mode of operation is selected automatically without user intervention.

21. The system of claim 1, wherein said spatial light modulator is selected from the group consisting of an analog based light modulator, a pulse-width modulation based light modulator, a liquid crystal display (LCD) panel, a liquid crystal on silicon (LCOS) device, a diffractive light device (DLD), and an array of micromirrors.

* * * * *